United States Patent [19]
Kripl, deceased

[11] 3,848,157
[45] Nov. 12, 1974

[54] BRUSHLESS DC-TACHOMETER

[75] Inventor: Josef F. Kripl, deceased, late of Binghamton, N.Y. by Maria A. Kripl, executrix

[73] Assignee: International Business Machine Corporation, Armonk, N.Y.

[22] Filed: Oct. 11, 1972

[21] Appl. No.: 296,735

[52] U.S. Cl.................. 317/5, 310/171, 340/271
[51] Int. Cl. ........................................ H02k 17/42
[58] Field of Search .......... 310/171; 340/271; 317/5

[56] References Cited
UNITED STATES PATENTS

| | | | |
|---|---|---|---|
| 2,228,090 | 1/1941 | Smith.................. | 324/165 |
| 2,738,433 | 3/1956 | Schroeder et al.......... | 310/171 |
| 2,738,434 | 3/1956 | Couzens et al. .......... | 310/171 |
| 2,889,475 | 6/1959 | Emerson .............. | 310/171 |
| 2,898,486 | 8/1959 | Sheldon .............. | 310/171 |
| 2,987,671 | 6/1961 | Williams .............. | 310/171 |
| 3,614,616 | 10/1971 | Bucek et al........... | 340/271 |
| 3,728,565 | 4/1973 | O'Callaghan .......... | 340/271 |

Primary Examiner—L. T. Hix
Attorney, Agent, or Firm—John S. Gasper

[57] ABSTRACT

A brushless dc tachometer system includes a first coil driven by a high frequency oscillator, a second coil which senses change in magnetic field, a non-magnetic rotatable disk element mounted on a shaft concentric with the first and second coils to provide a means for coupling magnetic fields and a detecting system including logic circuits coupled to the output of the second coil for producing an ultimate output signal proportional to the speed and direction of rotation of the input shaft.

3 Claims, 5 Drawing Figures

PATENTED NOV 12 1974 3,848,157

3,848,157

BRUSHLESS DC-TACHOMETER

BACKGROUND OF THE INVENTION

The present invention relates to velocity sensing systems and more particularly to velocity sensing systems including means for sensing the polarity as well as the magnitude of velocity.

In the prior art, so-called conventional dc tachometers with brushes while providing a usable output signal, have the great disadvantage of low reliability and short lifetime due to mechanical wear on the brushes.

Digital tachometers in the form of optical or capacitive transducers or magnetic emitters are sufficiently accurate only when operating above a minimum speed. These digital tachometers completely lose their function at a stop condition. Also, these digital tachometers do not indicate the direction of motion.

Another prior art tachometer system includes a cylindrical rotor constructed of an electrical conductive material which is driven in a constant magnetic field by a rotating member whose velocity and direction is to be measured. The constant magnetic field is produced by one or more pairs of permanent magnets. The cylindrical rotor structure coupled with the permanent magnets of the prior art tachometer results in a bulky structure, the operation of which is dependent upon the strength of permanent magnets which deteriorate with age.

SUMMARY OF THE INVENTION

Therefore, it is a primary object of the present invention to indicate by a voltage magnitude and polarity the velocity and direction of rotation of a rotating member.

It is another object of the present invention to indicate the velocity and direction of a rotating member by a brushless dc tachometer including a first coil driven by an oscillator to provide a varying magnetic field, a sensing coil, a rotatable non-magnetic conductive disk element, and circuit means connected to the sensing coil for rectifying and filtering the voltage output from the sensing coil to produce a dc output indicative of velocity and direction.

Accordingly, a preferred embodiment of the present invention includes means for generating an ac voltage, a first coil mounted on a ferromagnetic frame for generating a varying magnetic field, a second coil mounted on a second ferromagnetic frame for detecting changes in magnetic field, a rotatable conductive non-magnetic coupling means, driven by a rotating member whose velocity and direction is to be determined, for coupling an induced current from the first coil to the second coil to generate an output signal from the second coil indicative of the velocity and direction of rotation of the driving device and circuit means connected to the second coil for detecting and filtering the output signal to produce a dc voltage whose magnitude and polarity indicate the velocity and direction of the driving device.

The foregoing and other objects, features and advantages of the invention will be apparent from the following more particular description of a preferred embodiment of the invention, as illustrated in the accompanying drawing.

DETAILED DESCRIPTION OF THE INVENTION

Figure 1:
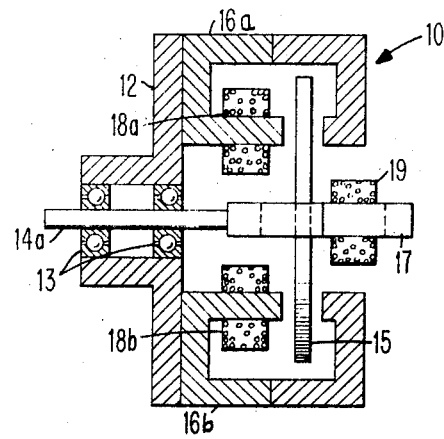
FIG. 1 is a cross-section view of a tachometer structure according to the present invention.
Figure 5:
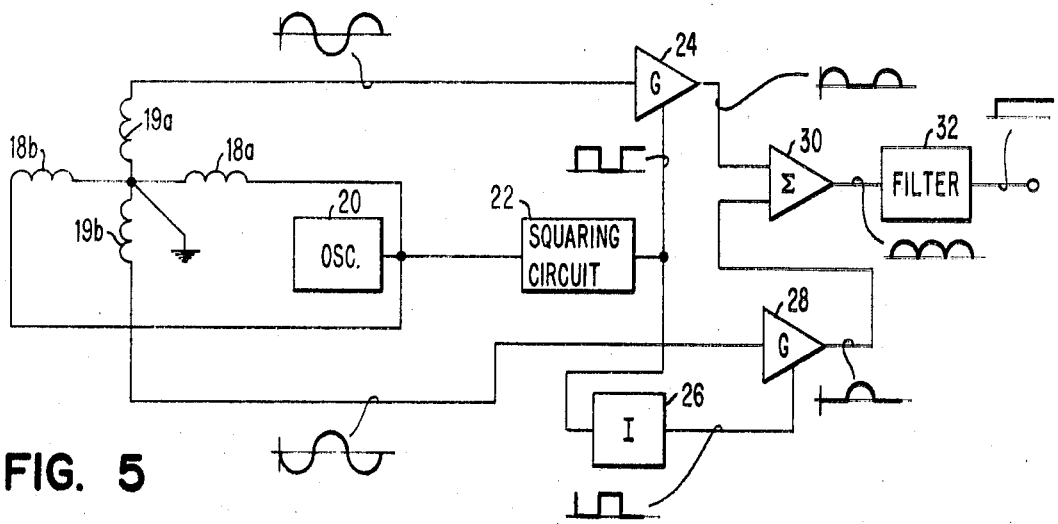
FIG. 5 is a schematic diagram of a brushless dc tachometer system according to the present invention.

Referring now to FIGS. 1 and 5, a preferred embodiment of the present invention will be described.

Tachometer structure 10 includes frame 12 containing bearings 13 which support shaft 14. Shaft 14 is driven by the device which is to have its motion velocity and direction indicated by the tachometer. Shaft 14 supports a non-magnetic conductive coupling means 15 which may be an alluminum disk.

Figure 2:
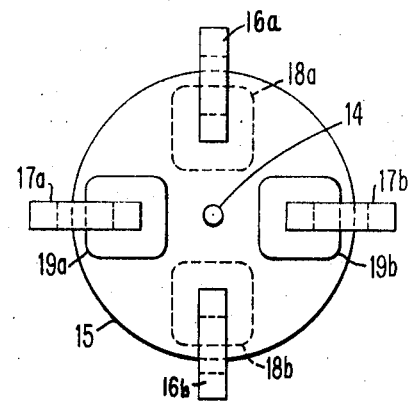
FIG. 2 is a front section view of the structure of FIG. 1.

Frame 12 also supports ferrite cores 16a, 16b, 17a and 17b (see FIG. 2). Input coils 18a, 18b are mounted on ferrite cores 16a and 16b, respectively. Output coils 19a and 19b (see FIG. 2) are mounted on ferrite cores 17a and 17b, respectively. Coupling means 15 passes through air gaps in the ferrite cores 16a, 16b, 17a, and 17b to couple induced currents from coils 18a, 18b to coils 19a, 19b when shaft 14 is rotating.

Oscillator 20 (see FIG. 5) drives input coils 18a and 18b with a high-frequency current, typically in the range of 20 kilohertz to 100 kilohertz. The output of oscillator 20 is a sinusoidal signal. Oscillator 20 is also coupled to squaring circuit 22 which generates a square wave signal from the sinusoidal output of the oscillator.

Figure 3:
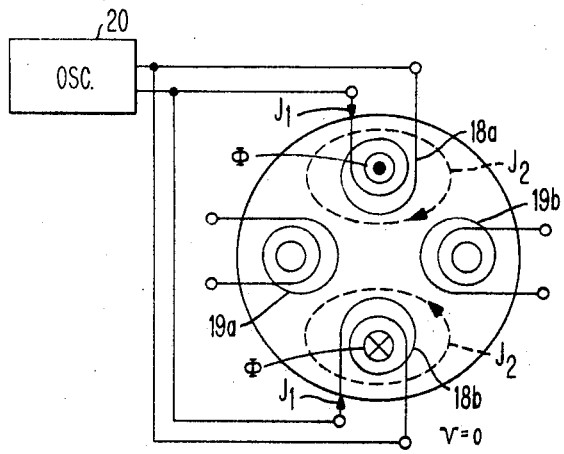
FIG. 3 is a schematic representation showing the coil structure of FIG. 2 with induced currents and flux fields where the input velocity is zero.

The coupling between oscillator 20 and input coils 18a, 18b and the output coils 19a, 19b are shown in more detail in FIG. 3. Current J1 flowing in coils 18a and 18b induces a flux in magnetic cores 16a, 16b in the directions indicated by the dot and the x in FIG. 3. A current J2 is induced in coupling means 15 in the vicinity of input coils 18a and 18b. FIG. 3 illustrates the condition in which the shaft 14 has a velocity of zero indicating no rotation. Therefore, it is desirable to have no signal output from output coils 19a, 19b. Coils 19a, 19b are positioned such that with no rotation of coupling means 15 no current is induced thus resulting in a zero voltage output at zero velocity of the input shaft.

Figure 4:
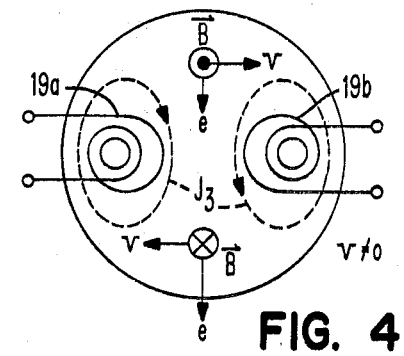
FIG. 4 is a schematic representation similar to FIG. 3 where the input velocity is not equal to zero.

Referring now to FIG. 4, the coupling between input coils 18a, 18b and output coils 19a, 19b will be described where the input shaft is rotating at some velocity other than zero. As coupling means 15 rotates as indicated by velocity v, a voltage e is induced causing current J3 to flow in the coupling means. Current J3 rotating past output coils 19a, 19b induces an alternating voltage therein which is indicative of the rotation of shaft 14.

Referring again to FIG. 5, the operation of the detecting circuit will be described in more detail. When shaft 14 is rotating, the sinusoidal current from input coils 18a, 18b induce signals in output coils 19a, 19b as shown by the waveforms associated with the output coils respectively. The voltage output from coil 19b is 180° out-of-phase with the voltage output from coil 19a. Output coil 19a is coupled to a first gate means 24 and output coil 19b is coupled to a second gate means 28. Gate means 24 and 28 are well known currently available gated operational amplifiers capable of following an input signal of either polarity when the gate input is active. Since these circuits are well known in the prior art, they will not be described in further detail. The gate signal to gate means 24 is provided by the output of squaring circuit 22 directly. The gate signal to gate means 28 is provided from squaring circuit 22 through inverter 26 to be 180° out-of-phase for the gate signal to gate means 24. Inverter 26 may be any well known inverter circuit including the same circuit as is used for gate means 24 and 28 with the gate line connected to a fixed potential to maintain the circuit in the ON condition.

As can be seen from FIG. 5, the gate signal to gate means 24 allows the gate to pass the odd half cycles of the input waveform. Similarly, gate means 28 passes the even half cycles of the input waveform. The respective outputs of gate means 24 and 28 are shown as inputs to summation circuit 30. Summation circuit 30 takes the algebraic sum of its two input lines and produces a direct current output signal representative of full wave rectification of the signal output of coils 19a, 19b. Filter 32 connected to the output of summation circuit 30 is a straightforward low pass filter which removes the ripple content of the output of summation circuit 30 to produce a dc voltage representative of the magnitude and direction of rotation of shaft 14 (see FIG. 1).

It should be noted that if shaft 14 were rotating in an opposite direction to that indicated above, the voltage induced in output coils 19a, 19b would be in the opposite direction (see FIG. 4) in that the induced voltage e would be in the opposite direction. This would result in the output signals from coils 19a, 19b to be of opposite polarity and thus the output of summation circuit 30 and ultimately filter 32 would be negative indicating an opposite direction of rotation.

While the invention has been particularly shown and described with reference to a preferred embodiment thereof, it will be understood by those skilled in the art that various changes in form and detail may be made therein without departing from the spirit and scope of the invention.

What is claimed is:

1. A device for sensing the rotational direction and speed of a rotatable member comprising
    a signal generator having
        a non-magnetic conductive rotor attached for rotation by said rotatable member; a pair of input windings proximate said rotor; a pair of output sense windings in quadrature with said input windings proximate said conductive rotor,
        said output sense windings being electromagnetically coupled to said input windings solely through said rotor,
        said output sense windings providing a pair of alternating output signals during rotation of said rotatable member having a phase relation and amplitude dependent on the direction and speed of rotation of said rotor;
    energizing means connected to said input windings for applying an alternating energizing current of predetermined frequency and amplitude to said input windings;
    and circuit means synchronized by said energizing means for converting said pair of alternating output signals from said output windings to a single unidirectional signal having a polarity and amplitude related to the direction and speed of said rotor.

2. A device for sensing the rotational direction and speed of a rotatable member in accordance with claim 1 in which
    said energizing means is a drive oscillator connected to said input windings,
    and said circuit means comprises
        a pair of gate circuits connected to receive said output signals separately from said output windings
        said gate circuits being connected to said oscillator for synchronously gating predetermined portions of said alternating output signals,
        and summing circuit means connected to the outputs of said gating circuits for summing the gated portions of said output signals
        said summing circuit producing a unidirectional signal of an amplitude and polarity related to the speed and direction of rotation of said rotor.

3. A device for sensing the rotational direction and speed of a rotatable member in accordance with claim 2 in which
    said synchronizing signal from said drive oscillator enables one gate circuit to gate odd half cycles of the output signal from one output winding, and enables the second gate circuit to gate even half cycles of the output signal from said second output winding.

* * * * *